(12) United States Patent
Machunze et al.

(10) Patent No.: US 12,387,703 B2
(45) Date of Patent: Aug. 12, 2025

(54) SEMI-ACTIVE NOISE CONTROL SYSTEM FOR AN AIRCRAFT

(71) Applicants: Airbus Operations GmbH, Hamburg (DE); Airbus S.A.S., Blagnac (FR)

(72) Inventors: Wolfgang Machunze, Hamburg (DE); Alois Friedberger, Hamburg (DE); Christian Thomas, Blagnac (FR); Martin Wandel, Blagnac (FR)

(73) Assignees: Airbus Operations GmbH, Hamburg (DE); Airbus S.A.S., Blagnac (FR)

( * ) Notice: Subject to any disclaimer, the term of this patent is extended or adjusted under 35 U.S.C. 154(b) by 245 days.

(21) Appl. No.: 18/209,770

(22) Filed: Jun. 14, 2023

(65) Prior Publication Data

US 2023/0419936 A1 Dec. 28, 2023

(30) Foreign Application Priority Data

Jun. 27, 2022 (EP) .................................... 22181346

(51) Int. Cl.
  *G10K 11/172* (2006.01)
  *G10K 11/16* (2006.01)
  *B64C 1/00* (2006.01)

(52) U.S. Cl.
  CPC .............. *G10K 11/16* (2013.01); *B64C 1/00* (2013.01); *B64C 2220/00* (2013.01)

(58) Field of Classification Search
  CPC ... G10K 11/16; G10K 11/172; B64C 2220/00
  USPC ................................ 381/71.4, 71.1, 71.2, 86
  See application file for complete search history.

(56) References Cited

U.S. PATENT DOCUMENTS

| | | | |
|---|---|---|---|
| 5,621,656 A * | 4/1997 | Langley | F16F 7/1005 73/648 |
| 5,954,169 A | 9/1999 | Jensen | |
| 6,295,363 B1 * | 9/2001 | Laak, Jr | G10K 11/161 381/94.1 |
| 6,564,640 B1 | 5/2003 | Allaei | |
| 7,757,808 B1 | 7/2010 | Vaz et al. | |
| 2010/0131114 A1 | 5/2010 | Stothers et al. | |

OTHER PUBLICATIONS

Extended European Search Report including Written Opinion for Application No. 22181346.2 dated Nov. 22, 2022, pp. 1-10.

* cited by examiner

*Primary Examiner* — Thjuan K Addy
(74) *Attorney, Agent, or Firm* — Lerner David LLP

(57) ABSTRACT

A semi-active noise control system includes a layer configured to be part of an interior panel of an aircraft The layer includes conductive tracks, a driver arrangement, tuned mass dampers, and sensors. Each tuned mass damper has an eigenfrequency that depends on a control signal applied to the tuned mass damper and is connected to the driver arrangement via a conductive track and configured to receive control signals from the driver arrangement. Each sensor is connected to the driver arrangement via a conductive track and is configured to sense vibrations and/or acoustic sounds and send measurement signals to the driver arrangement. The driver arrangement is configured to analyze the measurement signals and to generate and send control signals to the tuned mass dampers such that the eigenfrequency of the tuned mass dampers is matched with the frequency of the vibrations and/or acoustic sounds sensed by the sensors.

15 Claims, 5 Drawing Sheets

SEMI-ACTIVE NOISE CONTROL SYSTEM FOR AN AIRCRAFT

FIELD OF THE INVENTION

The present disclosure relates to noise control systems in general, and in particular to semi-active noise control systems for aircraft applications as well as an aircraft having such semi-active noise control system.

BACKGROUND OF THE INVENTION

Oftentimes, acoustic noise is undesired. For example, in aircraft cabins, vibrations of the fuselage of the aircraft and of interior components lead to disturbing noise within the cabin. Such vibrations may for example result from the operation of the turbines or propellers or from drag forces exerted onto the aircraft during flight, and are mechanically propagated to the cabin, where they produce acoustic noise that may be unpleasant for passengers and crew. Noise control or noise cancellation systems are in principle known in the art. Active systems, for example, utilize microphones and loudspeakers, where the microphones measure the sounds or rather the noise to be canceled. The loudspeakers are then commanded to create counter sounds which are, for example, opposite in phase to the noise to be cancelled. These noise control systems are, e.g., known for headphones. However, active noise control systems consume a relatively large amount of energy. Purely passive noise cancellation systems are also known in the art and often called DVA (Dynamic Vibration Absorber), TMA (Tuned Mass Absorber) or mass-spring system. Such systems usually utilize oscillating masses coupled to elastic elements, such as springs, having a characteristic frequency response and therefore are only suitable to control or damp specific single sound frequencies.

In aircraft applications, in order to implement active systems, currently relatively large actuators (such as loudspeakers) and sensors (such as microphones) are used which are distributed in regions of the aircraft where noise cancellation is desirable. These components, as well as the harnesses used to connect them, are relatively large, heavyweight and cause high installation effort. Therefore, in order to meet the weight and cost requirements, only a relatively small amount of such actuators and sensors can be used. Purely passive systems on the other hand are not as easily adjustable to changing noise environments because of their fixed frequency response.

BRIEF DESCRIPTION OF THE INVENTION

An aspect of the disclosure may provide an adjustable lightweight and energy saving semi-active noise control system.

According to a first aspect, a semi-active noise control system is provided. The semi-active noise control system comprises a layer. The layer is configured to be part of an interior panel of an aircraft and comprises a plurality of conductive tracks, a driver arrangement, a plurality of tuned mass dampers, and a plurality of sensors. Each of the plurality of tuned mass dampers comprises an eigenfrequency that depends on a control signal applied to the tuned mass damper. Each of the plurality of tuned mass dampers is connected to the driver arrangement via at least one of the plurality of conductive tracks and is configured to receive control signals from the driver arrangement. Each of the plurality of sensors is connected to the driver arrangement via at least one of the plurality of conductive tracks. Each of the sensors is configured to sense vibrations and/or acoustic sounds and to send measurement signals to the driver arrangement. The driver arrangement is configured to analyze the measurement signals and to generate and send control signals to the tuned mass dampers such that the eigenfrequency of the tuned mass dampers is matched with the frequency of the vibrations and/or acoustic sounds sensed by the sensors.

In general, undesired noise in an aircraft cabin may result from vibrations or oscillations either of the fuselage itself or of components within the cabin. Thereby, the noise frequency corresponds to the frequency of such vibrations. In purely passive tuned mass damping systems, noise components having a certain frequency are attenuated, e.g., by spring-mass systems that are attached to the vibrating component/structure and that comprise an eigenfrequency that corresponds to the frequency of the undesired vibrations. Such tuned mass dampers comprise, for example, an oscillating mass which is connected to a structure via a spring or other elastic element with the characteristics of a spring. If the eigenfrequency of the tuned mass damper matches the frequency of the noise component to be attenuated, the vibration of the tuned mass damper is in resonance. Therefore, excitation of the tuned mass damper by the vibrations leads to strong oscillations of the tuned mass damper. The tuned mass damper thereby abates vibrational movements of the structure it is attached to. Hereby, the moving mass of the tuned mass damper is 90° out of phase compared to the structure, which leads to a significant reduction of the structural movements.

Within an aircraft, the noise profile may differ from location to location. For example, in passenger aircrafts, the noise profile will vary at regions close to turbines or propellers with regard to more distant regions such as the front or rear of the aircraft. The variations thereby can involve both frequency and amplitude. However, purely passive systems cannot be adapted to changing noise profiles but are fixed to certain predetermined frequency components.

The semi-active noise control system of the present disclosure therefore utilizes tuned mass dampers, the eigenfrequencies of which are adjustable by adjusting the mechanical structure, e.g., by adjusting a structure or form of an elastic element, as described further below. By using certain sensors (such as vibration sensors and/or acoustic sensors), the frequencies of either the vibrations itself or of the resulting noise may be determined. The eigenfrequencies of the tuned mass dampers may then be adjusted to the measured noise profile, and in particular to the determined noise frequency or frequencies. The semi-active noise control system thereby differs from purely active systems in that the tuned mass dampers do not actively generate counteracting noise components, e.g., by means of a loudspeaker or similar actively driven device. Instead, the noise reduction itself is achieved passively by the current mechanical characteristics of the tuned mass dampers. The disclosed noise control system is referred to as "semi-active" because these mechanical characteristics (achieved by damping system shape modification or more precisely by modifying the spring shape) can be actively adapted to the desired noise profile (described further below) while the damping itself occurs passively. This allows for flexible noise damping with low energy consumption.

The disclosed semi-active noise control system allows for the utilization of many relatively small and lightweight sensors and tuned mass dampers, such as miniaturized microphones and/or vibration sensors and miniaturized tuned mass dampers that are adjustable in their damping characteristics, respectively. Additionally, heavyweight harnesses can be avoided. On the one hand, this allows for flexible adaption to different regions within the cabin. On the other hand, the system further may be easily maintained, e.g., if certain components need to be replaced. These advantages are, in particular, achieved by using a layer having all the necessary devices (in the form of miniaturized devices) and components mounted thereon or integrated into it.

The layer of the disclosed system thereby may be an integral part of a surface of an interior panel or other component of an aircraft, or the layer may be a separate/distinct element that is mounted onto a surface of the interior panel or other component, such as a foil.

For the integrated solution, for example, the layer may be a surface layer of the component itself and the conductive tracks may be directly printed onto the surface layer. The functional components (tuned mass dampers, driver arrangement, sensors) may be directly mounted onto the surface layer of the component and may be connected by the conductive tracks according to the principles described herein.

For the separate element solution (foil solution), the layer may, for example, be any foil suitable to print or otherwise create electronic circuits on it, such as on a circuit board. In particular, the foil may be a flexible and stretchable foil, so that it can be adapted to different surrounding shapes. This allows the foil to be applied to flat surfaces as well as to curved surfaces such as the inner wall of the fuselage itself. Additionally, such a foil may have interconnection points, e.g., at edge areas, which allow the foil to be connected to a second foil. In this way, a large structure or surface to be covered by the semi-active noise control system may be separated into different partial foils, allowing for easy replacement of component of the semi-active noise control system when, e.g., a critical number of devices on the foil, such as the tuned mass dampers, sensors or driver devices of the driver arrangement, as described below, need to be replaced. In this way, the corresponding foil segment may be replaced without having to replace the complete foil. The foil may be attached to interior elements of the aircraft cabin. For example, the foil may be attached to floor or ceiling panels or to any other surface within the aircraft cabin. Further, the foil may have power connectors connected to some of the conductive tracks which serve to deliver electrical power to the driver arrangement. Additionally, and optionally, the foil may build a mesh having cutouts, such that no foil is present at regions where no functional components (tuned mass dampers, driver arrangement, sensors) are needed. This design further reduces weight because no foil is present at regions where no devices and no conductive tracks are present. Further, optionally, the foil may be a flexible and/or stretchable foil, such that the foil and therefore the semi-active noise control system may be easily adapted to the surrounding structure.

The conductive tracks may be similar to conductive tracks of a circuit board and allow different components on the foil (separate/foil solution) or component itself (integrated solution) to be connected with each other. The foil of the "foil solution" and the surface layer of the "integrated solution" may hereinafter simply be referred to as "layer". In particular, the conductive tracks may replace conventional harnesses such as regular cables or wires, thereby reducing weight. The conductive tracks may build an electronic network between single components such as the tuned mass dampers, the sensors, and the driver arrangement.

The sensors are configured to, either directly or indirectly, measure a noise spectrum within the cabin at the region where the specific sensor is located. Thereby, direct measurement refers to measuring vibrations of the specific component onto which the layer is applied. This method is referred to as direct measurement because the vibrations can be the source of undesired noise. Such direct measurement sensors may, for example, be mechanical vibration sensors such as piezo devices or accelerometers or any other small vibration sensor that can be applied to a printed circuit. The vibration sensors thereby measure vibrations which are propagated from the structure, onto which the layer is mounted/integrated, to the layer. Indirect measurement refers to measuring the noise itself, after it has been created. Such sensors may, for example, be miniaturized microphones, such as MEMS-devices or CMUTs or other microphones, as described below. However, any other small sound sensor may be utilized that can be integrated into a printed circuit. The sensors are distributed over the layer at locations, where noise measurement is desired or useful. These sensors are connected to the driver arrangement and send corresponding measurement signals to the driver arrangement.

The driver arrangement may be an arrangement of one or more driver devices, which are distributed over the layer, such that individual ones of the driver devices are responsible for a defined subset of the sensors and of the tuned mass dampers. By way of example, one driver device of the driver arrangement may be assigned to eight sensors and eight tuned mass dampers. In particular, an individual driver device may serve sensors and tuned mass dampers close to the driver device. However, these are only examples and an individual one of the driver devices may also serve any other number of sensors and/or tuned mass dampers on any location at the layer, depending on the capabilities of the individual driver device.

The individual driver devices may, for example, be integrated microchip components configured to perform certain analysis algorithms on the measurement signals from the sensor. However, instead of integrated microchip components that are on the layer, it is, e.g., also conceivable that all or some of the sensors and/or tuned mass dampers communicate with an external computing device (such as with a computer in the aircraft cockpit) via the conductive tracks and an additional wiring. In such instances, the external computing device performs the functionalities of the driver arrangement. The driver devices may be configured to extract certain frequency components of the measurement signals and to generate corresponding control signals for the tuned mass dampers. These control signals may be designed to adjust the eigenfrequencies of the tuned mass dampers such that they match the frequency/frequencies of the respective noise components. Thereby, the eigenfrequencies of all the tuned mass dampers may be matched with the same noise frequency or the eigenfrequencies of individual tuned mass dampers may be matched with individual noise frequencies, for example at the location of the respective tuned mass damper.

Each of the plurality of tuned mass dampers receives the control signals from an associated driver device of the driver arrangement via associated conductive tracks.

By using many small sensors and associated tuned mass dampers that are distributed over the layer, the tuned mass dampers may absorb and dissipate enough vibrational energy from the structure to damp the noise as desired, even though individual tuned mass dampers absorb and/or dissipate only a relatively small amount of energy. Further, by using a layer having many sensors and tuned mass dampers thereon, easy adjustment to the noise profiles at different locations is possible.

According to an embodiment, at least one of the tuned mass dampers comprises an elastic element and a damper mass that is connected to the elastic element. The elastic element comprises an adjustable stiffness (or in general adjustable spring rate) to support the damper mass.

The elastic element may, for example be a mechanical element having a stiffness, such as for example a bending stiffness or other stiffness for supporting the damper mass, that depends on the shape of the elastic element, such as a flexible arc-shaped element or a foil-like element, as described below. In particular, the elastic element may be any suitable elastic and/or form adaptive element that can be changed in shape in order to adjust the eigenfrequency/spring rate of the tuned mass damper. An arc-shaped element may, for example, consist of two or more arc portions that carry the damper mass in between. The damper mass is supported by or connected to the elastic element, such that the elastic element and the damper mass define a "spring-mass" system having a characteristic eigenfrequency that depends on the current shape of the elastic element.

According to another embodiment, the bending stiffness of the elastic element is adjustable by changing the shape of the elastic element.

By changing the shape of the elastic element, the eigenfrequency of the "spring-mass" system can be changed. Therefore, by appropriately deforming the shape of the elastic element (e.g., by electricity, heat, or mechanical deformation via actuators, as described below), the eigenfrequency of the tuned mass damper can be matched with a noise frequency to be reduced. The corresponding deformation of the elastic element thereby is controlled by the control signals sent by the driver arrangement in response to the driver arrangement receiving measurement signals form the sensors regarding the noise. The tuned mass dampers then reduce vibrational motion corresponding to the set eigenfrequency from the component onto which the layer is mounted, so that these frequency components of the noise are reduced.

According to another embodiment, the elastic element is an electro active polymer, and the damper mass is supported by the electro active polymer.

Such an electro active polymer changes its size or shape when stimulated by an electric field. Therefore, by applying a corresponding voltage to the electro active polymer the shape of the polymer can be changed. The electro active polymer may, for example, be in the form of a foil that is fixed to the layer of the semi-active noise control system at the edges of the electro active polymer. A voltage may be applied, e.g., to opposite terminals of the electro active polymer, such that an electric field emerges within the polymer, so that the electro active polymer deforms in response to the voltage.

According to another embodiment, the shape of the electro active polymer can be changed by applying the control signal in the form of a voltage to the electro active polymer.

As described above, the shape of an electro active polymer can be changed by applying a voltage across opposite terminals of the electro active polymer. The control signal from the driver arrangement, or rather from an individual driver device of the driver arrangement, may therefore be a voltage that is applied to the electro active polymer via two of the plurality of conductive tracks. In general, the specific shape of the electro active polymer, and with it the eigenfrequency of the tuned mass damper, depends on the amplitude of the voltage. Therefore, by appropriately adjusting the amplitude of the voltage signal (control signal), the eigenfrequency of the tuned mass damper can be adjusted. The driver arrangement or other computing device connected to the driver arrangement may, for example, include a look up table of voltages for corresponding frequencies and the driver arrangement may select the corresponding voltage for the frequency to be damped from the lookup table. However, this is only one example. The driver arrangement may also calculate the corresponding values from a model or by means of another algorithm on the fly.

According to another embodiment, at least one of the tuned mass dampers further comprises an actuator that is configured to change the shape of the elastic element in response to the control signal being applied to the actuator.

If, for example, as described above, the elastic element is an arc-shaped element whose eigenfrequency depends on the shape of the arc-shaped portions, an actuator may be arranged at the arc-shaped portions to displace these portions, so that the shape of the arc is changed and with it the bending stiffness and therefore the eigenfrequency of the tuned mass damper. The actuator may, for example, be a piezo electric actuator that can be controlled by the control signal. The actuator may be connected with the driver arrangement via the conductive tracks and the driver arrangement may, for example (again) comprise a look up table or computer model or other algorithm to determine the corresponding control signal for the actuator for the desired frequency.

According to another embodiment, the actuator is one of a piezo electric actuator, an electrostatic actuator, and a bimetal actuator.

According to another embodiment, the elastic element is a shape memory alloy that is configured to change shape in response to the control signal applied to the elastic element.

Such a shape memory alloy may, e.g., comprise different shapes at different temperatures and an electrical current (as control signal) may be conducted through the shape memory alloy in order to heat the shape memory alloy and thereby change its shape. However, the shape of the shape memory alloy may also depend on any characteristic other than temperature, that can be controlled by the driver arrangement.

According to another embodiment, at least one of the plurality of sensors is a micro electro-mechanical system device (MEMS-device).

Such MEMS-devices are microscopic components having moving parts. MEMS-devices may be made up of components between 1 and 100 micrometers in size and the MEMS devices itself range in size from 20 micrometers to one millimeter. In general, such devices can be used to generate sound as well as to sense sound and/or vibrations. In particular, as described herein, the MEMS-devices may act as sound sensors in order to detect noise that is to be suppressed. In general, acoustic MEMS-devices comprise a flexible membrane which starts to vibrate in response to impinging sound waves. The MEMS-device then creates corresponding electrical measurement signals. Further, the MEMS-devices can also be actuated, for example, electrostatically or piezoelectrically, in order to generate sound waves if desired. The MEMS-devices may, for example, be CMUTs, as described below. However, any other suitable MEMS-device may be used, too.

The MEMS-devices may be integrated in large numbers (e.g., in the order of several thousands) on the layer, e.g., on foils or foil strips, such as the foil used in the semi-active noise control system (in the separate/foil solution of the semi-active noise control system) or may be directly connected to a surface layer of a component (integrated solution). Therefore, MEMS-devices may be used to detect noise at different locations on the layer.

According to another embodiment, at least one of the plurality of sensors is a capacitive micromachined ultrasonic transducer (CMUT).

CMUTs are a subtype of MEMS-device for sound detection (and generation). Such CMUTs can be extremely miniaturized and may also be used for low frequencies. From a sustainability point of view, they are favorable over, for example, lead zirconate titanate piezo elements (PZT elements). CMUTs are in principle known in the art. Therefore, their functionality will not be described in great detail. However, usually CMUTs are operated having an alternating voltage between a metal contact on top of a flexible membrane and a counter electrode below. These electrodes together build a capacitance. CMUTs may either be used as sensor or as actuator or as both. In the semi-active noise control system disclosed herein, the CMUTs are used as sensor devices for detecting noise. However, it is also conceivable that some of the CMUTs (or of the sensors in general) may be used to additionally generate counter noise, e.g., in the form of sound components opposite in phase to the detected noise, in order to cancel the noise, if the dampening provided by the tuned mass dampers is not enough.

When used as a sensor or microphone, as in the present disclosure, CMUTs are operated according to the principle of a condenser microphone. The sound wave causes the flexible membrane to vibrate mechanically. The resulting change in capacitance generates an alternating current between the electrodes via a bias voltage, which is converted to an alternating voltage by a current-voltage converter. This voltage can be further processed with a commercially available ultrasonic testing device.

According to another embodiment, at least one of the plurality of sensors is a microphone.

Such a microphone may be a CMUT or other MEMS-device or any other suitable microphone device that is capable of detecting sound waves. The term "microphone", when used herein, therefore refers to any device or structure capable of sensing sound waves. In this regard, loudspeakers are used in embodiments where the noise profile is measured indirectly by measuring the noise after it has been created by the vibrations of the cabin component onto which the semi-active noise control system is mounted.

According to another embodiment, at least one of the plurality of sensors is an accelerometer.

Such an accelerometer may provide indirect noise measurement by measuring the movement of the corresponding component itself and with this the measurement of noise generating vibrations of the component, e.g., of a panel or wall within an aircraft. The accelerometer may be any device for measuring accelerations and/or movements known in the art.

According to another embodiment, the layer is a flexible and/or stretchable foil.

By using such a flexible and/or stretchable foil, the foil and therefore the semi-active noise control system may be easily adapted to the surrounding structure.

According to a second aspect, an aircraft is provided. The aircraft comprises a fuselage, a cabin, and a semi-active noise control system according to any one of the embodiments described above.

According to an embodiment, the semi-active noise control system is attached to or integrated into an inner wall of the fuselage or to an interior panel within the cabin. The semi-active noise control system is configured to detect noise within the cabin and to absorb the noise by adjusting the eigenfrequencies of the tuned mass dampers accordingly.

The semi-active noise control system may, for example, be attached to partition walls, ceiling panels, floor panels, overhead compartments, or any other structure within the cabin. Further, the semi-active noise control system may be attached to the fuselage itself at the inside of the cabin. The semi-active noise control system may also be hidden by paintings, cladding panels or other structures.

Further, the semi-active noise control system may be connected to a control computer within the aircraft which may be used to control operation of the driver arrangement and therefore of the semi-active noise control system. Instead of a control computer, a simple on/off switch or other device for controlling operation may be used.

In summary, the present disclosure provides a modular semi-active noise control system, in particular for aircraft applications, that combines the advantages of purely active noise control systems with the advantages of purely passive noise control or noise dampening systems. The system further is easily maintainable. In the foil solution in particular, defective components may be easily replaced by replacing corresponding foil segments. Further, the integrated design utilizing a large amount of acoustic and/or vibration sensors and tuned mass dampers allows for easy adjustment of the noise cancellation functionality to different environments. The design further reduces weight because large and heavy devices are not necessary. Compared to purely active noise control systems, the semi-active noise control system provides low power consumption while nevertheless providing adjustable damping characteristics. Compared to purely passive noise control systems, e.g., utilizing spring-mass systems with a fixed frequency response, the semi-active noise control system provides for adjustability to different noise frequencies. Further, the need for heavy harnesses is eliminated by the disclosed system.

Although the semi-active noise control system is described as directly adjusting the eigenfrequencies of the tuned mass dampers in order to match them with the frequency of the vibrations and/or acoustic sounds sensed by the sensors, it should be appreciated that the system may also be used in the sense of a feedback loop, such that the sensors monitor a sound level and the tuned mass absorbers, or rather their eigenfrequencies, are tuned until the sound/noise level becomes sufficiently low.

Further, although the present disclosure is described with regard to aircraft applications, it should be noted, that the disclosure may be used for any suitable application, such as for automotive applications, train application, and similar applications where noise cancellation/noise damping is desired. For example, the disclosure could also be used to provide noise damping within rooms of buildings by attaching or integrating the described semi-active noise control system to the walls of the room.

BRIEF DESCRIPTION OF THE DRAWINGS

In the following, exemplary embodiments are described in more detail having regard to the attached figures. The illustrations are schematic and not to scale. Identical reference signs refer to identical or similar elements. The figures show.

DETAILED DESCRIPTION

Figure 1:
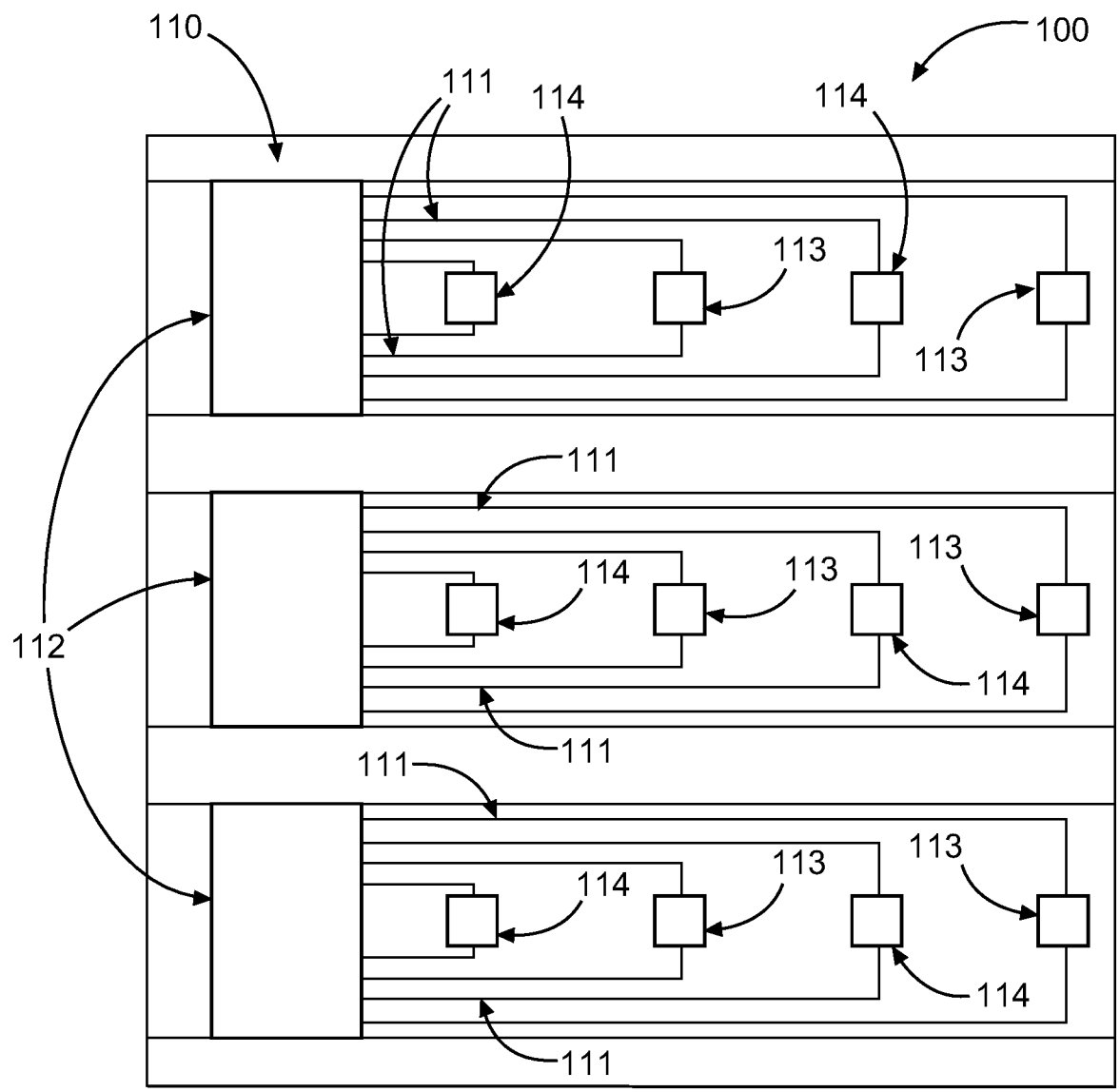
FIG. 1 a highly schematic top view of semi-active noise control system comprising a foil having a plurality of tuned mass dampers and a plurality of sensors both connected to a driver arrangement via a plurality of conductive tracks.

FIG. 1 highly schematically shows a semi-active noise control system 100. The semi-active noise control system comprises a layer 110, a plurality of conductive tracks 111, a plurality of tuned mass dampers 113 (six tuned mass dampers 113 are shown), a plurality of sensors 114 (six sensors 114 are shown) and a driver arrangement 112 made up of three driver devices 112 in the depicted configuration. The sensors 114, tuned mass dampers 113 and driver devices 112 are grouped in three lines, each comprising one driver device 112 (the three driver devices 112 together building the driver arrangement 112), two sensors 114 and two tuned mass dampers 113. Each of the sensors 114 and of the tuned mass dampers 113 are connected to one driver device 112 by two conductive tracks 111. For example, one of these two conductive tracks 111 connecting a single sensor/tuned mass damper 114, 113 to a driver device 112 may be a ground potential. The other one of the two conductive tracks 111 may, for example, be utilized by the sensors 114 to send corresponding measurement signals 115 (see FIG. 2) to the respective driver device 112. In the case of the tuned mass dampers 113, the second one of the corresponding two conductive tracks 111 may be used by the driver device 112 to send corresponding control signals 116 (see FIGS. 3 and 4) to the respective tuned mass dampers 113.

The conductive tracks 111 may be designed according to the specific requirements and may, for example, be constructed on the layer 110 by printing them onto the layer 110, as is known in the art.

FIG. 1 only schematically shows a section of the layer 110 (e.g., of a foil), which is indicated by the conductive tracks 111 which reach until the left and right end of the layer 110. In general, the layer 110 may be designed according to the specific requirement and in particular comprises a large amount of driver devices 112, sensors 114 and tuned mass dampers 113.

The layer 110 may, for example, be a flexible foil, so that it can be easily adjusted to a surrounding structure where it is to be attached to (such as an inner wall of an aircraft fuselage). However, the layer 110 may also be a surface layer of a component. The conductive tracks 111 build a circuit network between the sensors 114, the tuned mass dampers 113 and the driver devices 112.

The sensors 114 may, for example, be MEMS-devices such as the CMUTs described above and below with regard to FIG. 2. However, the sensors 114 may also be any other sensor device suitable for detecting vibrations and/or acoustic waves. For example, the sensors 114 may also be any kind of microphones or may be piezo electric elements or accelerometers for detecting mechanical vibrations in the layer 110 which are propagated into the layer 110 from the structure onto which the layer is mounted/into which it is integrated.

The sensors 114 generate corresponding measurement signals 115 containing frequency information about the noise to be cancelled and send these signals to the driver devices 112. The driver devices 112, in turn, analyze these measurement signals for undesired noise and generate corresponding control signals 116 for the tuned mass dampers 113. These control signals 116 may, for example, be voltage signals for an electro active polymer, or control signals for an actuator 118 that is configured to deform an elastic element 116 of a tuned mass damper 113, so that the eigenfrequencies of the tuned mass dampers 113 are matched with the frequencies of the undesired noise, as described above and below with regard to FIGS. 3 and 4. One driver device 112 may serve multiple sensors 114 and/or tuned mass dampers 113. In particular, a single driver device 112 may serve sensors/tuned mass dampers 114, 113 close to the particular driver device 112. Further, the driver arrangement 112 (the entirety of the driver devices 112) may be connected to a central control computer or other device controlling operation of the driver arrangement 112 and therefore of the active noise control system 100.

Further, additionally or instead of measurement signals 115 of sensors integrated into the foil 110, measurement signals 115 of sensors 114 external to the foil 110 may be incorporated, such as of microphone devices arranged within the room to be noise controlled (e.g., an aircraft cabin). This may further increase accuracy of the noise cancellation.

The tuned mass dampers 113 may be spring-mass elements having an elastic element 116 (not shown, see FIGS. 3 and 4) with an adjustable bending stiffness and a damper mass 117 (not shown, see FIGS. 3 and 4), such as described above and below, whose bending stiffness may be adjusted by changing the shape of the elastic element 116. The eigenfrequency of the tuned mass dampers 113 in general depends on the shape of the elastic element 116. Therefore, by adjusting the shape, the eigenfrequency of the tuned mass damper 113 and with it the damping characteristics of the tuned mass damper 113 may be matched with the frequency of the noise to be damped, as described further above. The tuned mass dampers 113 may, for example, comprise electro active polymers, arc-like structures and/or shape memory alloys as elastic elements 116 that support or carry a damper mass 117 (see FIGS. 3 and 4). All the tuned mass dampers may be of the same kind, or individual tuned mass dampers 113 may be of a different kind. The mechanisms for adjusting the eigenfrequencies of such tuned mass dampers 113 have already been described further above. The damping of the noise is achieved purely passively by the current mechanical properties/shape of the tuned mass dampers 113. The control signals are only used to adjust the eigenfrequencies of the tuned mass dampers 113 by changing the shape of the corresponding elastic elements 116.

By integrating a large number of miniaturized sensors 114, such as MEMS-devices (e.g., CMUTs) or other microphones, tuned mass dampers 113, and miniaturized driver devices 112 into a layer 110 (e.g., a foil), a highly redundant and flexible semi-active noise control system may be built. In particular, having all the components integrated into the layer and connected by printed conductive tracks, heavy devices and harnesses may be avoided. Further, because of the large number of devices, if only some of them fail, the system still keeps functional. Also, even if a critical amount of the integrated devices fails, maintenance time and cost is reduced because the corresponding layer/foil segment can be easily replaced without having to rewire the structure. For this, a complete semi-active noise control system 100 may, for example, be built from several foil segments which may be connected with each other by corresponding terminals (not shown). Because the damping of the noise itself occurs purely passively by the tuned mass dampers 113 ("spring-mass" system) absorbing vibrational energy corresponding to their set eigenfrequencies, energy consumption of the system is greatly reduced compared to fully active systems that actively create counter noise.

Figure 2:
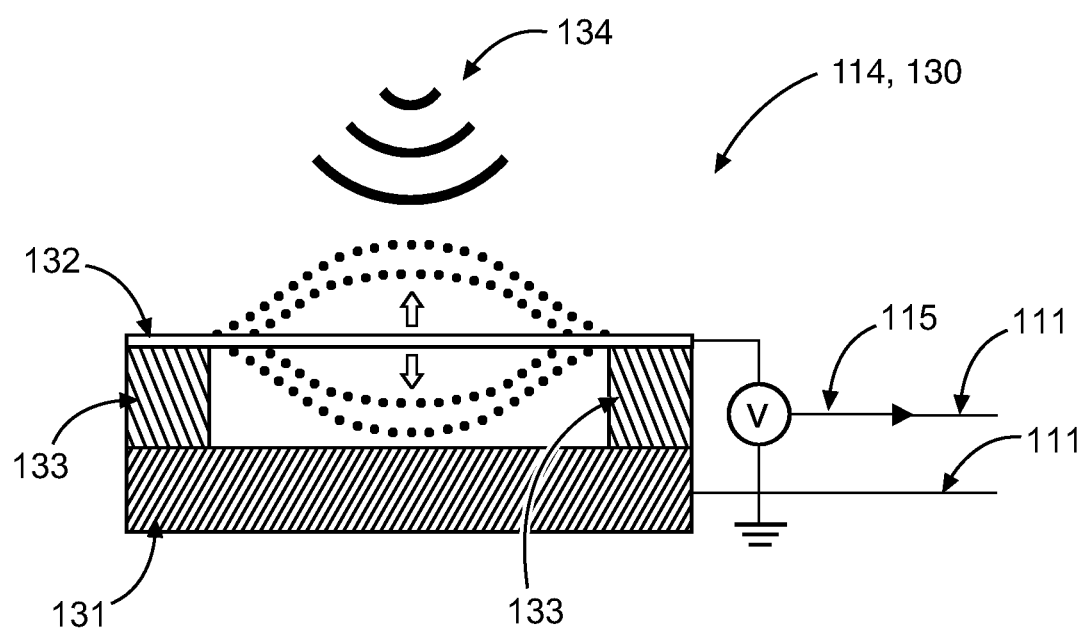
FIG. 2 a schematic view of one of the sensors of the semi-active noise control system of FIG. 1 in the form of a capacitive micromachined ultrasonic transducer (CMUT).

FIG. 2 shows a schematic view of a capacitive micromachined ultrasonic transducer (CMUT) in a reception mode, i.e., used as one of the sensors 114 of the semi-active noise control system 100 of FIG. 1. The CMUT 114 comprises a substrate or counter electrode 131 and a flexible membrane 132. At the circumference, the flexible membrane 132 is fixedly connected to the counter electrode 131 by a spacer structure 133. The flexible membrane 132 can oscillate with regard the substrate or counter electrode 131. The counter electrode 131 and the flexible membrane each comprise a metallized layer (not shown) which together build a capacitor. These capacitor electrodes are contacted, so that a voltage between the two electrodes may be measured. For example, the counter electrode 131 may be connected to a ground potential. The electrode built by the flexible membrane 132 may be connected to one of the driver devices 112 of the driver arrangement 112. When noise sound waves 134 impinge on the flexible membrane 132, the flexible membrane starts to oscillate. Therefore, the capacitance of the capacitor built by the counter electrode 131 and the flexible membrane 132, and with it the voltage between the two, changes according to the noise sound waves 134. The resulting measurement signal 115 is sent to one of the driver devices 112 via one of the conductive tracks 111, which analyzes this noise signal, as described above with regard to FIG. 1. The CMUT 114 may be integrated into the layer/foil 110 by means known in the art.

Figure 3:
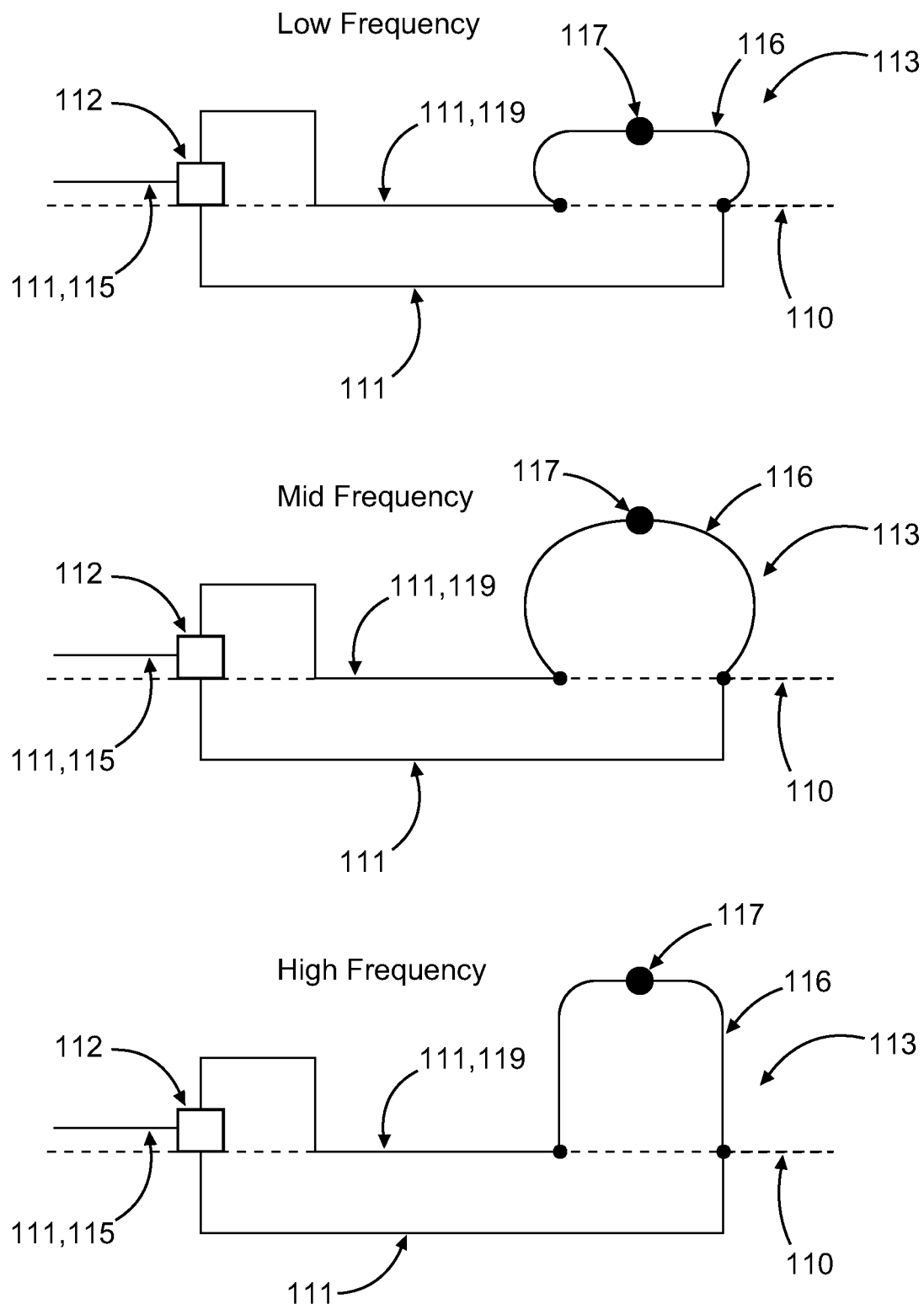
FIG. 3 a schematic view of one of the tuned mass dampers of the semi-active noise control system of FIG. 1 utilizing inherent properties of an elastic element for changing its shape, to adjust an eigenfrequency of the tuned mass damper.

FIG. 3 schematically shows one of the tuned mass dampers 113 of the semi-active noise control system 100 of FIG. 1 in three different eigenfrequency settings. The tuned mass damper 113 comprises an elastic element 116 and a damper mass 117 that is carried by the elastic element 116. The elastic element 116 and the damper mass 117 together build a spring-mass system. The elastic element is connected to a driver device 112 via two conductive tracks 111. The layer 110 onto which the tuned mass damper 113, the driver device 112, and a corresponding sensor 114 (not shown in FIG. 3) are mounted is indicated by a dashed line. It should be noted that the layer 110 in FIG. 3 is oriented perpendicular to the drawing plane. Further, although in FIG. 3 (and FIG. 4) the conductive tracks 111 are depicted outside the layer 110, it should be noted that all the conductive tracks 111 are on the layer 110. The illustration in FIG. 3 only is for clearly describing the working principle of the tuned mass dampers 113 and the connections with the other devices on the layer 110.

The driver device 112 receives a measurement signal 115 from a sensor 114 (such as a sound or vibration sensor) via at least one conductive track 111 and performs analysis on the measurement signal in order to detect noise. The driver device consecutively sends a control signal 119 via at least one of the conductive tracks 111 to the tuned mass damper 113, to match the eigenfrequency of the tuned mass damper 113 with the noise frequency.

The elastic element 116 in the configuration shown in FIG. 3 may be any elastic element 116 that changes shape in response to a voltage applied to the elastic element 116 or a current flowing through the elastic element 116. For example, the elastic element may be a foil made from an electro active polymer, a bimetal plate, an element made from a shape memory alloy, or any other elastic element 116 comprising the desired properties, as described further above. By applying a suitable voltage or driving a suitable current through the elastic element 116, the shape of the elastic element 116 is changed and with it the bending stiffness and therefore the eigenfrequency of the tuned mass damper 113 (spring-mass system). For example, if the elastic element 116 is an electro active polymer foil, one of the conductive tracks connected to the electro active polymer foil may be on a common ground potential while the other one is used to apply the voltage with regard to the ground potential. Once the shape of the elastic element 116 has been changed, and therefore the eigenfrequency of the tuned mass damper 113 has been matched with the noise frequency, the damping of the noise itself occurs purely passively by oscillations of the spring-mass system built by the elastic element 116 and the damper mass 117 absorbing vibrational energy from the structure onto which the layer 110 is attached or into which it is integrated. FIG. 3 shows the tuned mass damper 113 in damping settings for low noise frequencies, mid noise frequencies and high noise frequencies.

Figure 4:
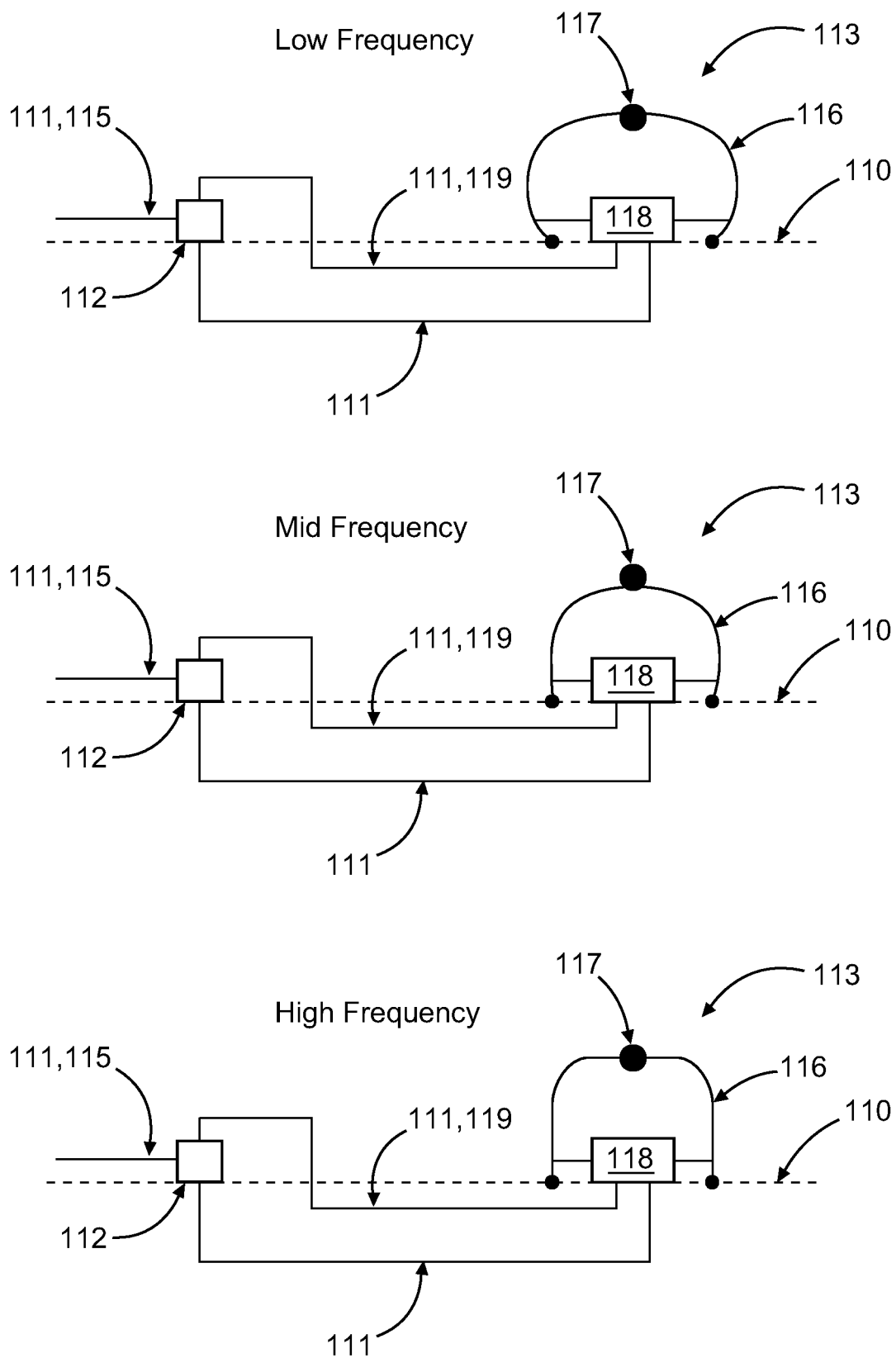
FIG. 4 a schematic view of one of the tuned mass dampers of the semi-active noise control system of FIG. 1 utilizing an actuator for changing the shape of an elastic element, to adjust an eigenfrequency of the tuned mass damper.

FIG. 4 shows an alternative configuration of a tuned mass damper 113. The tuned mass damper 113 of FIG. 4 differs from the tuned mass damper in FIG. 3 in that it further comprises an actuator 118. The actuator may be used to deform or change the shape of the elastic element 116 in response to control signals received from the driver device/driver arrangement 112. The elastic element 116 may for example comprise arc-like structures made from any suitable material. The actuator 118 may for example be a piezo electric element. However, any other suitable actuator 118 may be used. The working principle of the tuned mass damper of FIG. 4 is the same as in FIG. 3, apart from that the adjustment of the shape of the elastic element 116 is not achieved by utilizing inherent properties of the elastic element 116 itself but by actively deforming the elastic element 116.

Figure 5:
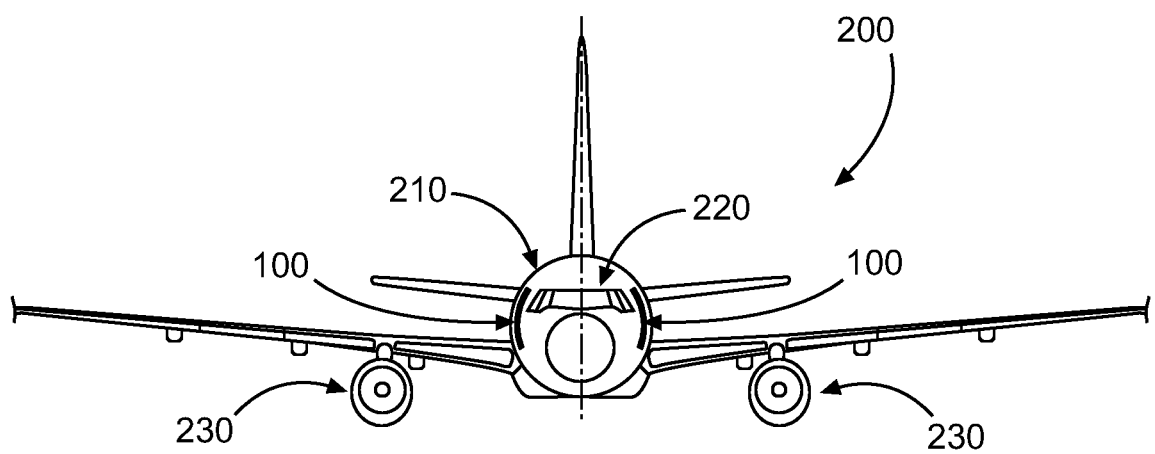
FIG. 5 a schematic view of an aircraft having a semi-passive noise control system.

FIG. 5 schematically shows an aircraft 200. The aircraft comprises a fuselage 210, turbines 230 and a cabin 220 enclosed by the fuselage 210. Two semi-active noise control systems 100, such as the semi-active noise control systems 100 of FIG. 1, are attached to left and right inner walls of the fuselage 210. In particular, the layers 110 of the active noise control systems 100 are attached to or integrated into the side walls, such that the layers 110 itself are fixedly connected to the respective inner walls of the fuselage 210 and the tuned mass dampers 113 and sensors 114 (in this case, acoustic sensors 114, such as MEMS-devices likes CMUTs, or other microphones) are directed towards the cabin 220 and away from the respective wall to which the respective layer 110 is attached. The sensors 114 therefore measure noise within the cabin 220 and send corresponding measurement signals to the driver arrangement 112. The driver devices of the driver arrangement 112 control the tuned mass dampers 113 accordingly, to adjust their eigenfrequencies to the frequency/frequencies of the noise sensed by the sensors 114, in order to damp these noise components.

The semi-active noise control system 100 therefore may be used according to the principles described above to damp/absorb undesired noise within the cabin 220, such as noise created by the turbines 230 or by drag forces acting on the fuselage 210 which lead to vibrations of the fuselage 210 and therefore to noise within the cabin 220. The semi-active noise control system 100 may be designed according to any one of the embodiments described herein.

Although shown as being attached to side walls of the aircraft 200, the semi-active noise control systems 100 may also be attached to other components of the aircraft, such as interior panels (floor panes, ceiling panels, partition walls, etc. (not shown in FIG. 5)).

It should be noted that "comprising" or "including" does not exclude other elements or steps, and "one" or "a" does not exclude a plurality. It should further be noted that features or steps that have been described with reference to any of the above embodiments may also be used in combination with other features or steps of other embodiments described above. Reference signs in the claims are not to be regarded as limitation.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS 100 semi-active noise control system
110 foil
111 conductive tracks
112 driver devices, driver arrangement
113 tuned mass dampers
114 sensors, miniaturized microphone
115 measurement signals
116 elastic element
117 damper mass
118 actuator
119 control signal
130 capacitive micromachined ultrasonic transducer (CMUT)
131 substrate, counter electrode
132 flexible membrane
133 spacer structure
134 noise sound waves
200 aircraft
210 fuselage
220 cabin
230 turbines

The invention claimed is:

1. A semi-active noise control system, comprising:
a layer configured to be part of an interior panel of an aircraft;
wherein the layer comprises:
a plurality of conductive tracks;
a driver arrangement;
a plurality of tuned mass dampers; and
a plurality of sensors;
wherein each of the plurality of tuned mass dampers comprises an eigenfrequency that depends on a control signal applied to the tuned mass damper;
wherein each of the plurality of tuned mass dampers is connected to the driver arrangement via at least one of the plurality of conductive tracks and is configured to receive control signals from the driver arrangement;
wherein each of the plurality of sensors is connected to the driver arrangement via at least one of the plurality of conductive tracks;
wherein each of the sensors is configured to sense vibrations and/or acoustic sounds and to send measurement signals to the driver arrangement; and
wherein the driver arrangement is configured to analyze the measurement signals and to generate and send control signals to the tuned mass dampers such that the eigenfrequency of the tuned mass dampers is matched with the frequency of the vibrations and/or acoustic sounds sensed by the sensors.

2. The semi-active noise control system of claim 1, wherein at least one of the tuned mass dampers comprises an elastic element and a damper mass connected to the elastic element, wherein the elastic element comprises an adjustable stiffness to support the damper mass.

3. The semi-active noise control system of claim 2, wherein the stiffness of the elastic element is adjustable by changing the shape of the elastic element.

4. The semi-active noise control system of claim 3, wherein the elastic element is an electro active polymer; and
wherein the damper mass is supported by the electro active polymer.

5. The semi-active noise control system of claim 4, wherein the shape of the electro active polymer is configured to be changed by applying the control signal in the form of a voltage to the electro active polymer.

6. The semi-active noise control system of claim 3, wherein at least one of the tuned mass dampers further comprises an actuator configured to change the shape of the elastic element in response to the control signal being applied to the actuator.

7. The semi-active noise control system of claim 6, wherein the actuator is one of a piezo electric actuator, an electrostatic actuator, and a bimetal actuator.

8. The semi-active noise control system of claim 2, wherein the elastic element is a shape memory alloy configured to change shape in response to the control signal applied to the elastic element.

9. The semi-active noise control system of claim 1, wherein at least one of the plurality of sensors is a micro electro-mechanical system device, MEMS-device.

10. The semi-active noise control system of claim 1, wherein at least one of the plurality of sensors is a capacitive micromachined ultrasonic transducer, CMUT.

11. The semi-active noise control system of claim 1, wherein at least one of the plurality of sensors is a microphone.

12. The semi-active noise control system of claim 1, wherein at least one of the plurality of sensors is an accelerometer.

13. The semi-active noise control system of claim 1, wherein the foil is a flexible and/or stretchable foil.

14. Aircraft, comprising:
a fuselage;
a cabin; and
a semi-active noise control system according to claim 1.

15. The aircraft of claim 14,
wherein the semi-active noise control system is attached to or integrated into an inner wall of the fuselage or to an interior panel within the cabin; and
wherein the semi-active noise control system is configured to detect noise within the cabin and to absorb the noise by adjusting the eigenfrequencies of the tuned mass dampers accordingly.

* * * * *